(12) United States Patent
Minko

(10) Patent No.: US 9,787,829 B1
(45) Date of Patent: Oct. 10, 2017

(54) PERSONAL-CALL AND FEATURE CONTROL SYSTEM AND METHOD FOR CONTROLLING TELEPHONES, PROVIDING EXTENDED FEATURES FOR SUCH TELEPHONES AND ROUTING OF MEDIA-RICH CALLS

(71) Applicant: Jacek Tomasz Minko, San Jose, CA (US)

(72) Inventor: Jacek Tomasz Minko, San Jose, CA (US)

( * ) Notice: Subject to any disclaimer, the term of this patent is extended or adjusted under 35 U.S.C. 154(b) by 0 days.

(21) Appl. No.: 15/268,316

(22) Filed: Sep. 16, 2016

Related U.S. Application Data

(60) Continuation of application No. 13/325,023, filed on Dec. 13, 2011, now Pat. No. 9,451,070, which is a division of application No. 10/898,543, filed on Jul. 26, 2004, now Pat. No. 8,077,851.

(60) Provisional application No. 60/489,964, filed on Jul. 25, 2003.

(51) Int. Cl.
*H04M 3/42* (2006.01)

(52) U.S. Cl.
CPC ... *H04M 3/42127* (2013.01); *H04M 3/42323* (2013.01); *H04M 3/42374* (2013.01)

(58) Field of Classification Search
USPC ............ 379/201.02, 201.03, 203.01, 204.01, 379/205.01, 207.01, 218.01, 211.01, 379/211.02
See application file for complete search history.

(56) References Cited

U.S. PATENT DOCUMENTS

| | | | |
|---|---|---|---|
| 4,680,786 A | 7/1987 | Baker et al. | |
| 5,528,666 A | 6/1996 | Weigand et al. | |
| 5,533,109 A | 7/1996 | Baker | |
| 5,574,780 A | 11/1996 | Andruska et al. | |
| 5,583,564 A | 12/1996 | Rao et al. | |
| 6,104,803 A | 8/2000 | Wesser et al. | |
| 6,161,134 A * | 12/2000 | Wang | G06F 1/1632 709/220 |
| 6,188,683 B1 | 2/2001 | Lang et al. | |
| 6,252,952 B1 | 6/2001 | Kung et al. | |
| 6,266,404 B1 | 7/2001 | Chon et al. | |
| 6,317,484 B1 | 11/2001 | McAllister | |
| 6,542,475 B1 | 4/2003 | Bala et al. | |
| 6,622,016 B1 | 9/2003 | Sladek et al. | |
| 6,628,776 B1 | 9/2003 | Lee | |
| 6,721,412 B1 * | 4/2004 | Youngs | H04M 3/46 379/142.04 |
| 6,823,197 B1 | 11/2004 | Chen et al. | |
| 7,174,189 B1 | 2/2007 | Chen et al. | |
| 7,554,927 B2 | 6/2009 | Hanna et al. | |

(Continued)

*Primary Examiner* — Yosef K Laekemariam
(74) *Attorney, Agent, or Firm* — Foley & Lardner LLP; Mark J. Danielson

(57) ABSTRACT

A Personal-CFC system and method is described for controlling a multiplicity of telephones, for providing extended feature sets globally to all such telephones and for routing of media-rich calls between such telephones and multimedia equipment. The Personal-CFC is a software program that is easily embedded in various devices and it requires no hardware. For example, a mobile Personal-CFC system can be incorporated into a PDA or PC. The end user can use the Personal-CFC system to control other telephones, such as conference telephones, that do not belong to the end user.

22 Claims, 13 Drawing Sheets

(56) References Cited

U.S. PATENT DOCUMENTS

| | | |
|---|---|---|
| 8,077,851 B2 | 12/2011 | Minko |
| 9,451,070 B2 | 9/2016 | Minko |
| 2002/0073207 A1 | 6/2002 | Widger et al. |
| 2003/0045267 A1 | 3/2003 | Himmel et al. |
| 2004/0139088 A1 | 7/2004 | Mandato |
| 2005/0008136 A1 | 1/2005 | Dobner et al. |
| 2005/0060411 A1 | 3/2005 | Coulombe et al. |
| 2005/0074111 A1 | 4/2005 | Hanson et al. |
| 2007/0083658 A1 | 4/2007 | Hanna et al. |
| 2009/0257568 A1 | 10/2009 | Suder et al. |

* cited by examiner

PERSONAL-CALL AND FEATURE CONTROL SYSTEM AND METHOD FOR CONTROLLING TELEPHONES, PROVIDING EXTENDED FEATURES FOR SUCH TELEPHONES AND ROUTING OF MEDIA-RICH CALLS

CROSS-REFERENCE TO RELATED APPLICATIONS

This application is a continuation of U.S. application Ser. No. 13/325,023 filed Dec. 13, 2011, now U.S. Pat. No. 9,451,070, which application is a divisional of U.S. application Ser. No. 10/898,543 filed Jul. 26, 2004, now U.S. Pat. No. 8,077,851, which claims priority under 35 U.S.C. §119(e) to U.S. Provisional Application No. 60/489,964, filed on Jul. 25, 2003, the contents of which applications are incorporated herein by reference in their entirety.

BACKGROUND

Field of the Invention

The present invention relates to a Personal Call and Feature Control (Personal-CFC) system and method for controlling telephones, for providing extended global features for telephones and for routing of media-rich telephone calls between telephones and multimedia equipment.

Background Information

A PBX (private branch exchange) is a telephone exchange which is dedicated to an individual company (or other organization), and is located on the company site. The function of the PBX is to transfer calls from a service provider (SP) into one of the many telephones within the company and from one of the many telephones within the company into the service provider. Because of the many interconnections involved, the PBX usually includes racks of bulky and expensive electronic equipment, which is usually capitalized.

Management for PBXs is performed by skilled technicians in the Company's Information Technology department. For that reason, personalization of features and end user management can be kept to a minimum (e.g., greetings message only). Telephones are considered physical extensions of the PBX to different location in the company. As a result, users are assigned (attached) to their own telephone.

A telephone can be customized with several features, such as, for example, speed dialing of personalized telephone numbers, voice dialing, redialing, and the like.

The telephone contains a basic feature set (BFS) that contains the rudimentary features needed for each endpoint. For example, a telephone endpoint can have 12 buttons (0-9, *, #) for data input. A PC terminal can have prompts such as "Start Video" and "Stop Video".

The telephone can also contain an enhanced feature set (EFS). Several examples include: speed dialing, voice dialing, voice announcement, call transfer, and the like. A person owning or using several different telephones will ordinarily use several different telephones and these will generally have correspondingly different values of EFS, considering the diverse technologies and software used to fabricate and control the different telephones. The telephone can also contain a multi-media feature set (MFS). A Feature Set (FS) is herein defined as one of the above sets: BFS, EFS or MFS, depending on the context used.

An "endpoint" will be defined herein as a device that provides capabilities for generating and/or terminating information streams. There are several types of endpoints. For example, a traditional telephone is used to terminate a voice media stream. Also, a combination of computer software and computer screen PC endpoint can be used to terminate a video and audio mixed media stream.

In the following, the word "telephone" or "phone" will be used in its most general sense, and can include, for example, a home telephone, an office telephone, a conference telephone, a cell phone, a Personal Data Assistant (PDA), a videophone, and the like.

Telephones with different capabilities or features can be provided in one company that is served by one PBX (e.g., basic-phone, executive-phone, conference-phone, and the like.). All these telephones provide different user interfaces. Also, due to the limited telephone interface, some features can be assigned to different buttons by different users. Therefore, using different telephones might provide a challenge to the end user. In addition, some telephones may not be capable of being easily upgraded with different features (e.g., video capability).

A service provider can include POTS, VoIP provider or Centrex system or the like.

In FIG. 1, service providers 120 (which can include Provider A, Provider B, . . . , and Provider N.) are connected to several telephones, including Phone A 150, Phone B 152, Phone C 154, . . . Phone N 158. These telephones can have different characteristics. For example, Phone A includes an extended feature set EFS A 170, Phone B includes a Basic Feature Set, BFS B 172, Phone C includes a Multimedia feature set, MFS C 174, and Phone N includes an extended feature set EFS 178. For example, a call from service provider 120 to Phone A will pass though EFS A 170, which has customized settings for controlling Phone A 150.

An End User 160 can be a person that is assigned to a particular telephone and that receives telephone services. End User 160 can activate any of the telephones such as Phone A 150, Phone B 152, Phone C 154, . . . , Phone N 158. In FIG. 1, Phone A 150 is shown by a solid line as being activated. Note that the various FS (EFS A 170, BFS B 172, MFS C 174, . . . EFS N 178) will generally be different from each other, owing to the different technologies and underlying software in the various corresponding telephones (Phone A 150, Phone B 152, Phone C 154, . . . Phone N 158.)

There are many inconveniences in the system shown in FIG. 1. For example, End User 160 may have to remember and separately utilize the different FS corresponding to the different telephones. This can be a cumbersome activity, but cannot be avoided with the present state of the art. Whenever a new telephone is added or replaces an old or broken telephone, End User 160 must change or learn its FS, which is even more cumbersome. Finally, whenever End User 160 wants to add a new personalized telephone number to an office phone or a home phone (e.g. Phone A 150 or Phone B 152), the End User 160 must recall the various keystrokes needed to activate the corresponding FS for each (e.g. EFS A 170 or BFS B 172). This can be very difficult, particularly for older telephones, where documentation can be misplaced or lost.

In summary, the prior art currently lacks a system and method which would allow End User 160 to access, utilize and globally upgrade EFS for all telephones, including those telephones belonging to End User and those telephones not belonging to the End User which would include nearby conference phones. Further, the prior art currently lacks a system and method which would allow a mobile End User 160 (such as a person walking with his PDA) to access, utilize and globally upgrade all EFS for all the telephones the End User 160 cares about. Finally, the prior art lacks multimedia splitting and redirecting, which would allow the audio portions of multimedia events to be heard at a convenient selected telephone, where video or other streams are directed to different physical devices.

SUMMARY OF THE INVENTION

In accordance with exemplary embodiments, the system includes a Personal-CFC system and method for providing the same enhanced feature set which can be used to globally control all telephones of interest, including those telephones not belonging to end users, and includes provisions for multimedia splitting and routing of media-rich calls between user's telephones and multimedia equipment.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

DESCRIPTION OF DRAWINGS

Figure 1:
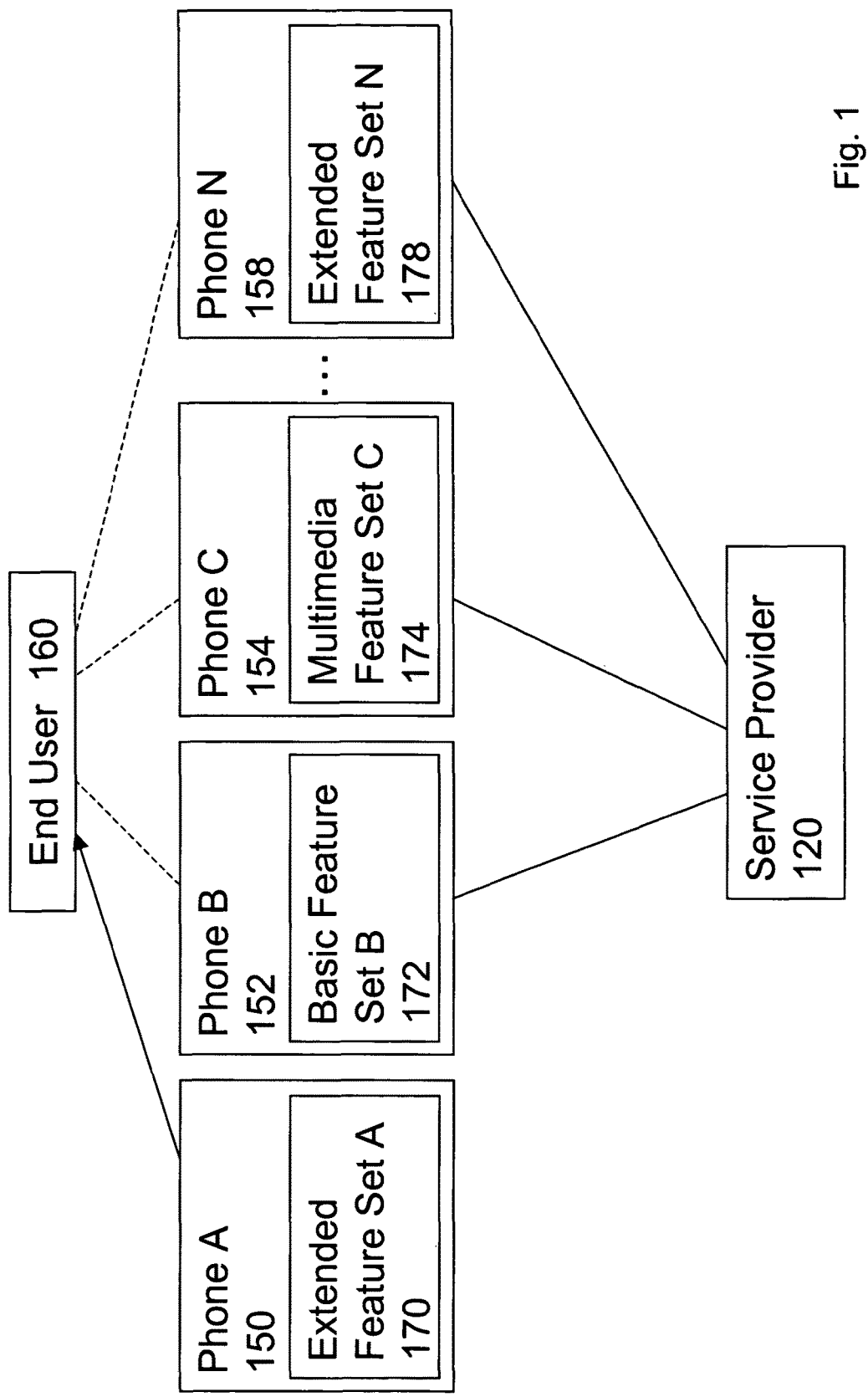

FIG. 1 is an illustration of telephone connections between a service provider and an end user.

Figure 2:
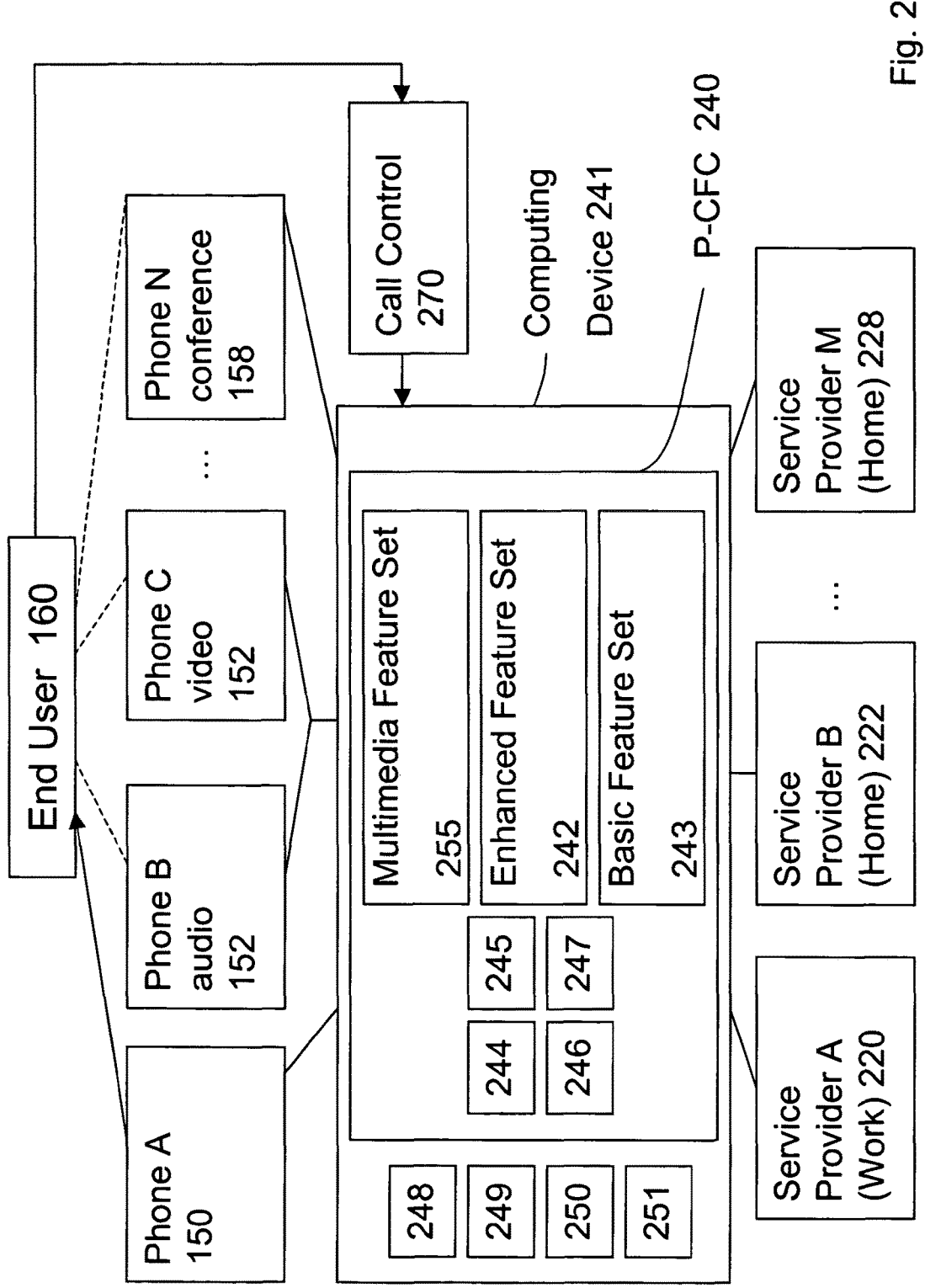

FIG. 2 is a diagram illustrating a Personal-CFC system and device showing global enhanced feature set, in accordance with an exemplary embodiment of the present invention.

Figure 3:
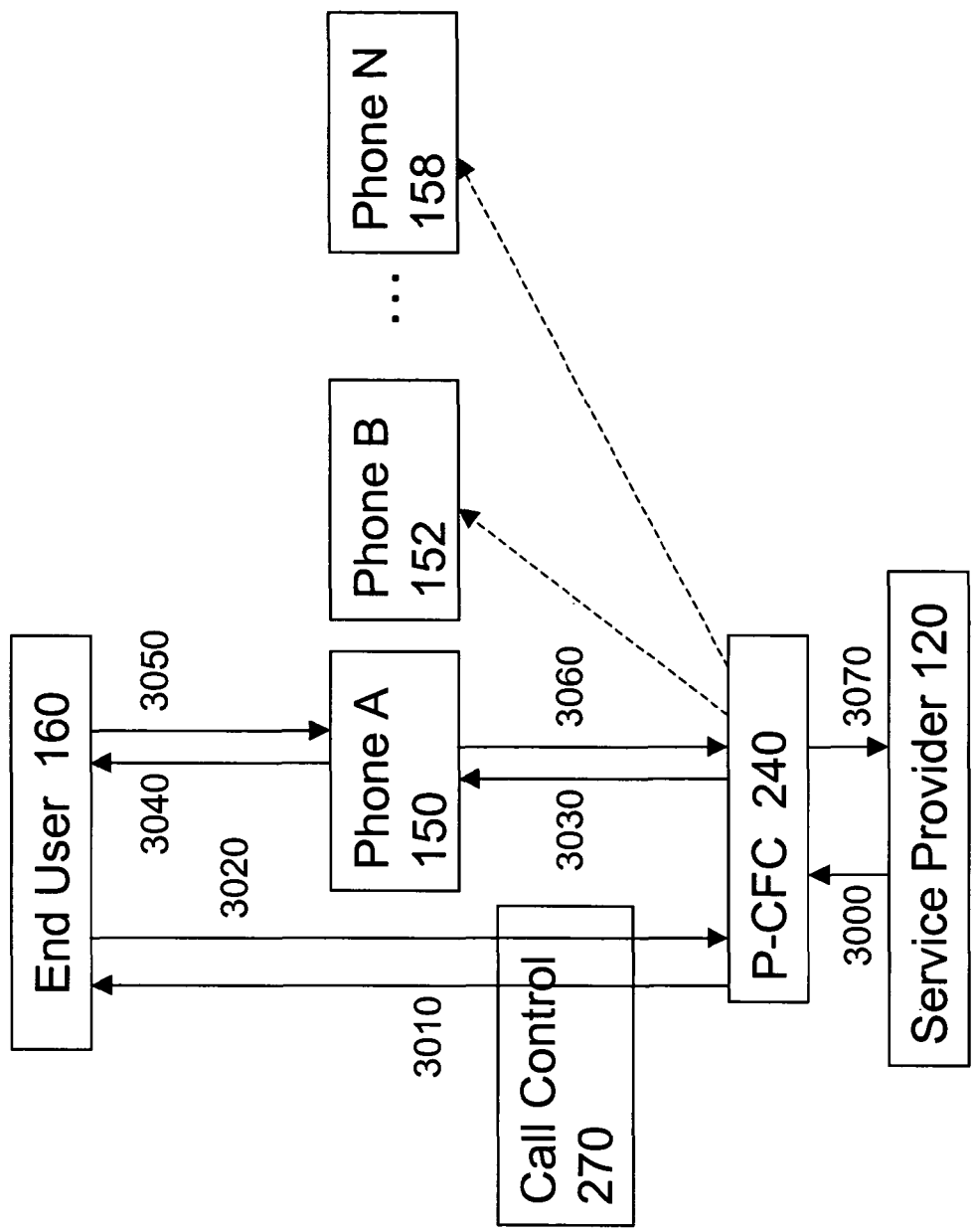

FIG. 3. Process flow showing incoming call.

Figure 4:
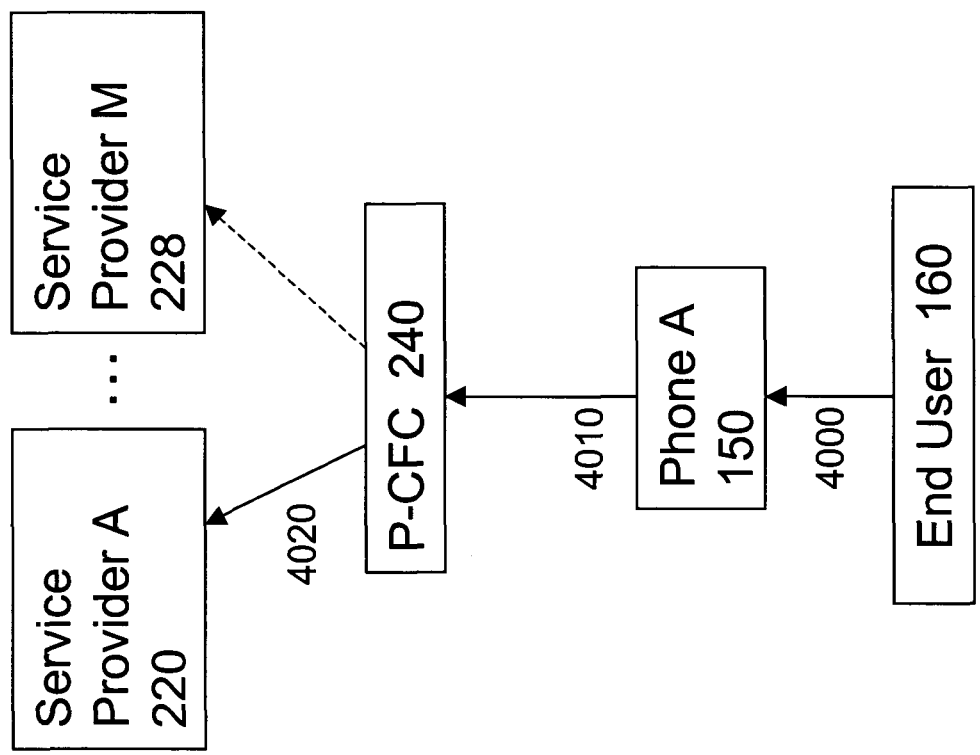

FIG. 4. Process flow showing outgoing call.

Figure 5:
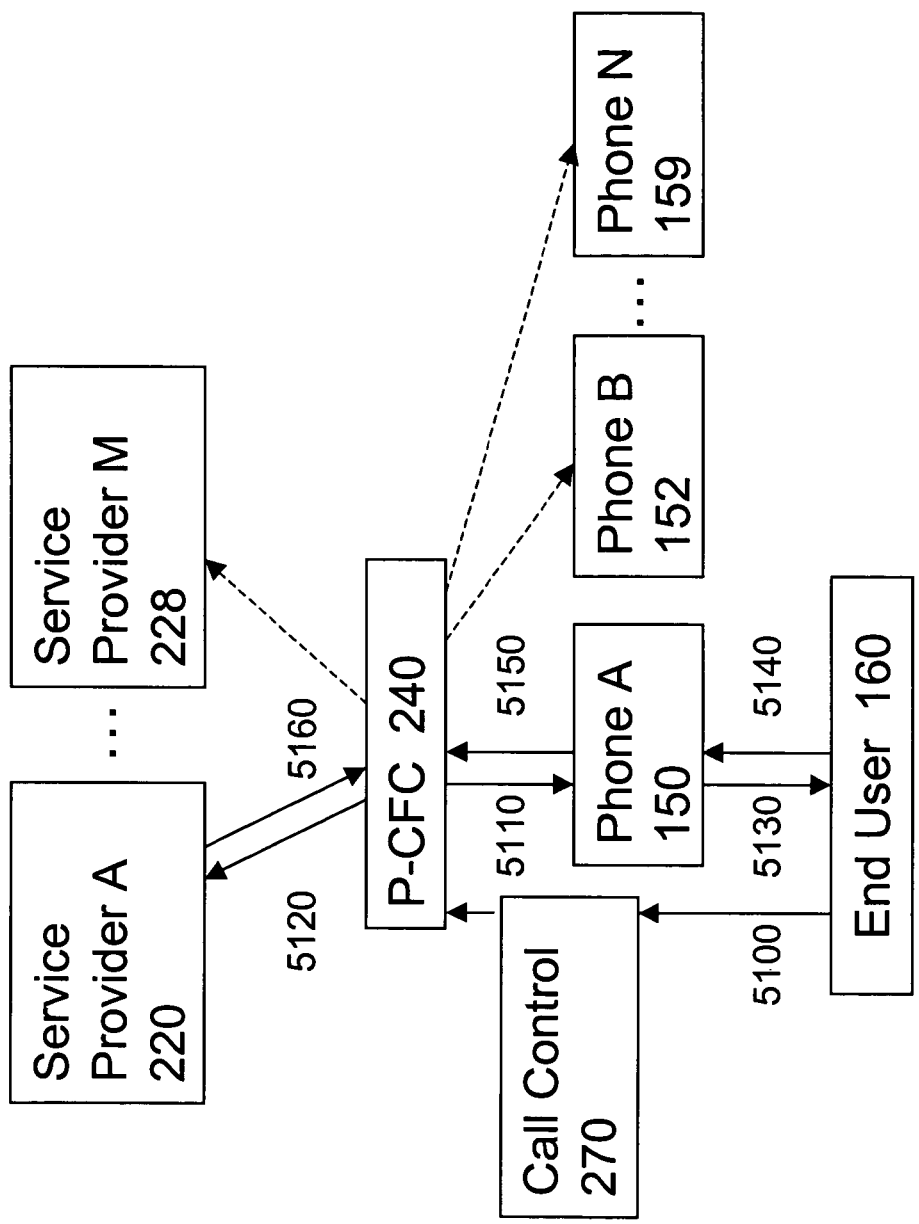

FIG. 5. Process flow showing outgoing call with explicit telephone selection.

Figure 6:
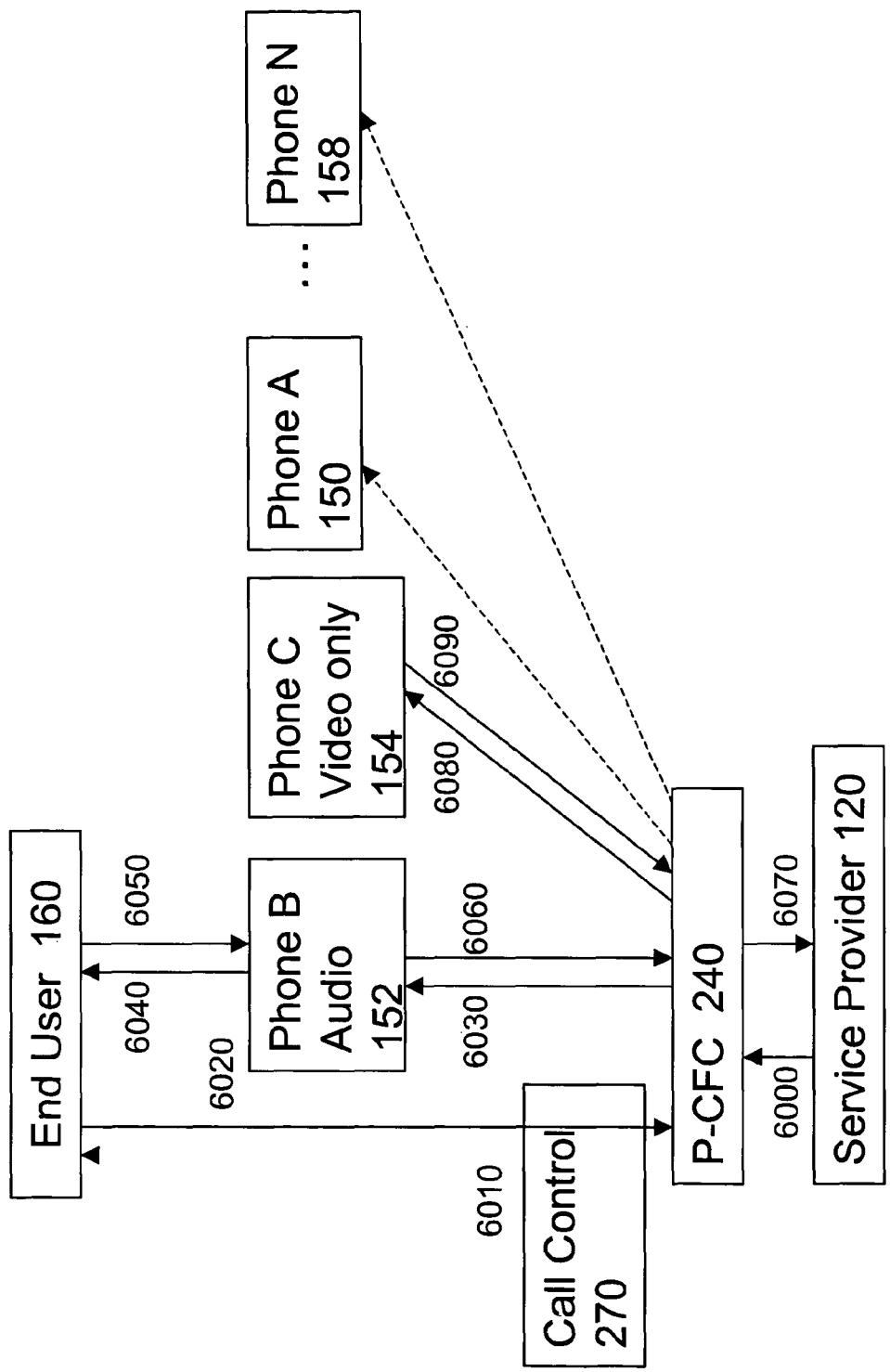

FIG. 6. Process flow showing incoming call with split media.

Figure 7:
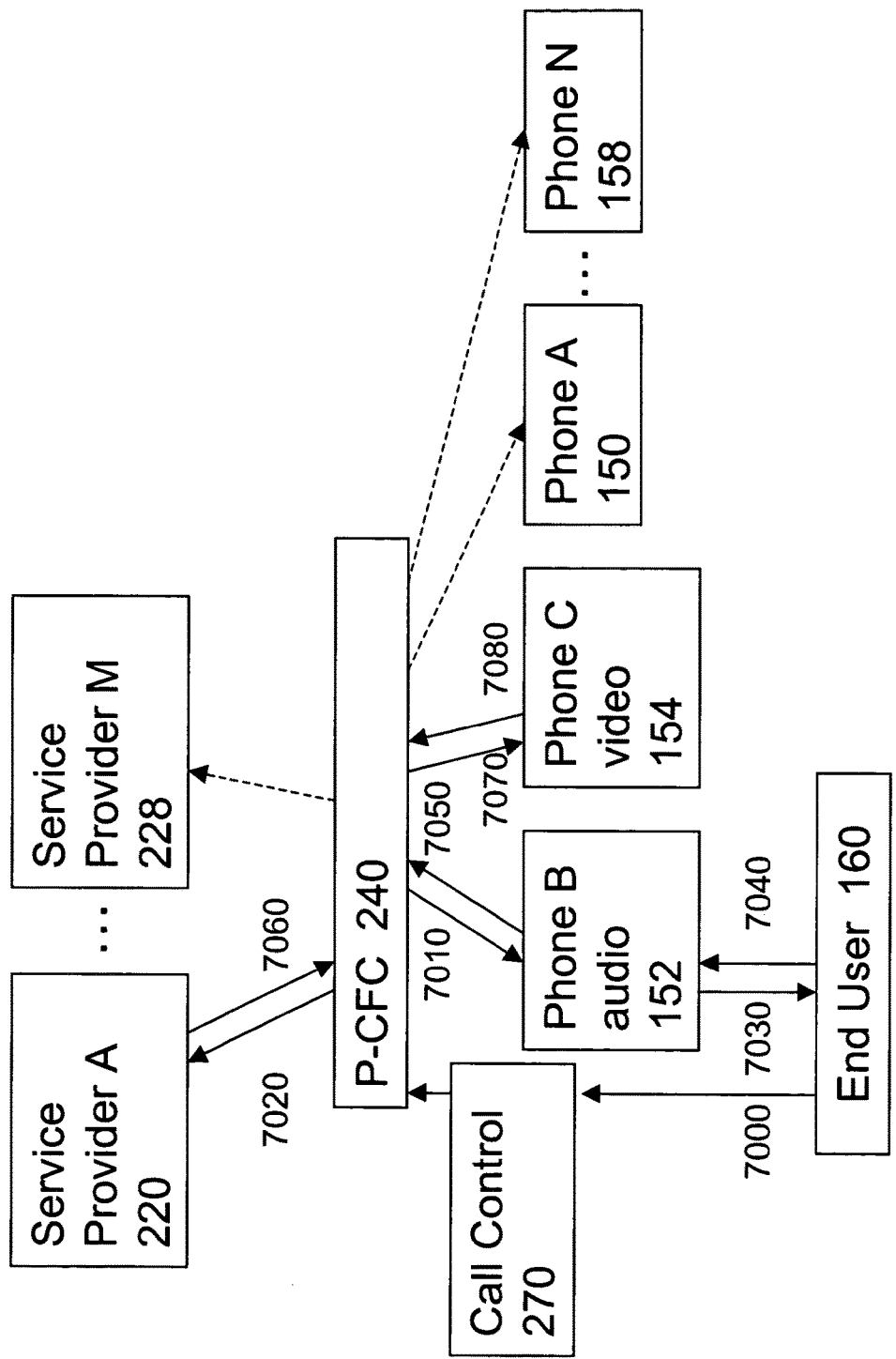

FIG. 7. Process flow showing outgoing call with split media.

Figure 8:
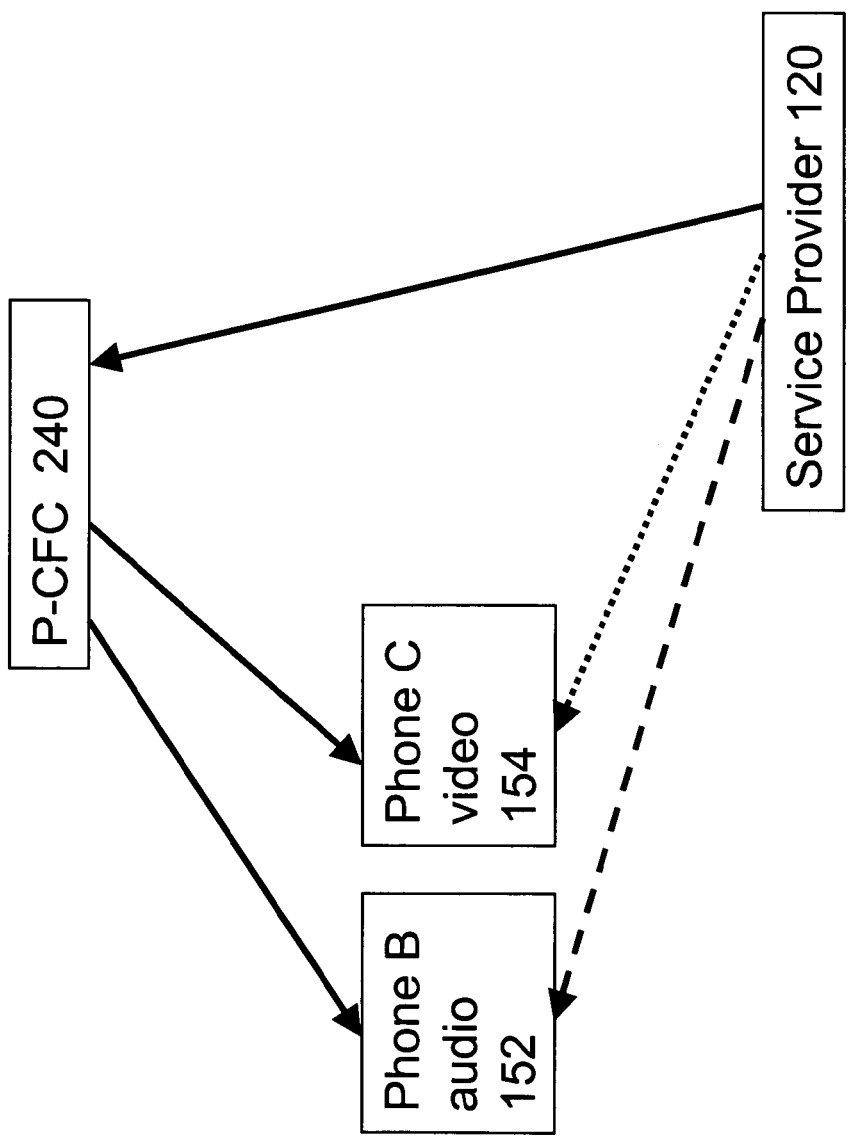

FIG. 8. Simplified Process flow showing outgoing call with split media.

Figure 9:
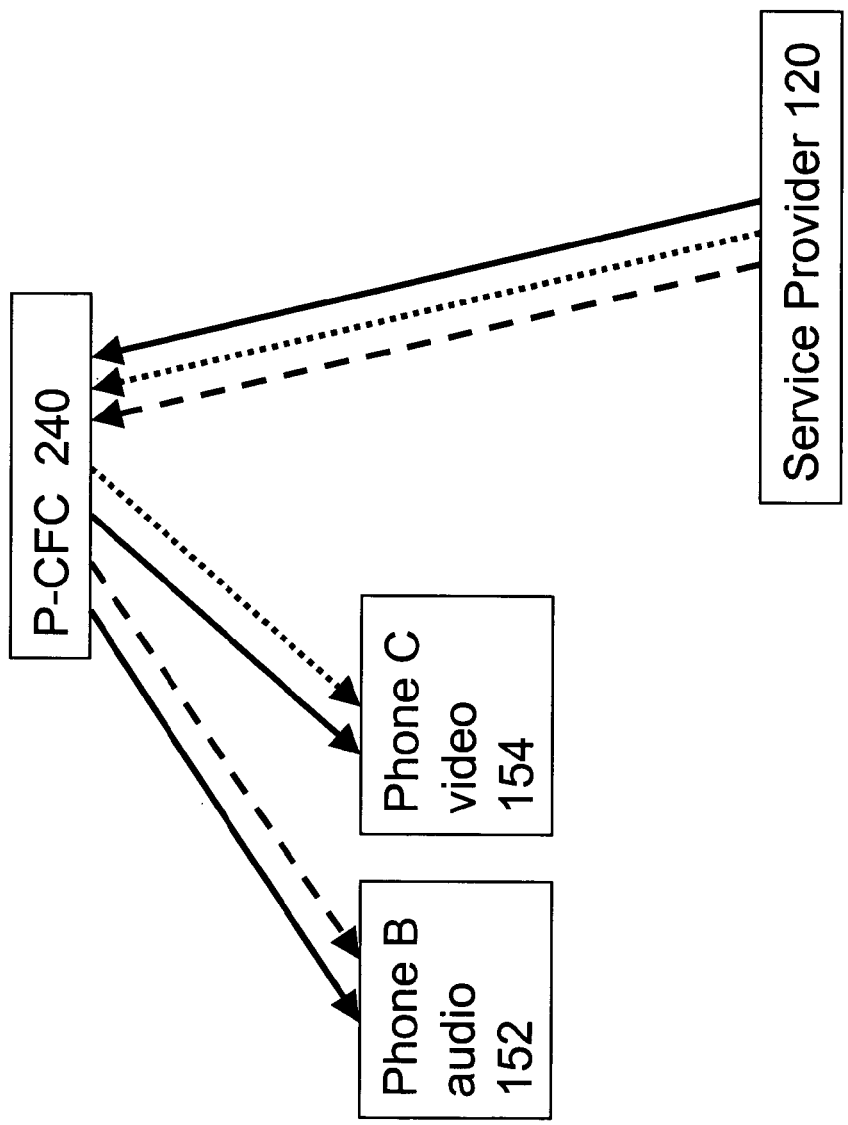

FIG. 9. Alternative Simplified Process flow showing outgoing call with split media.

Figure 10:
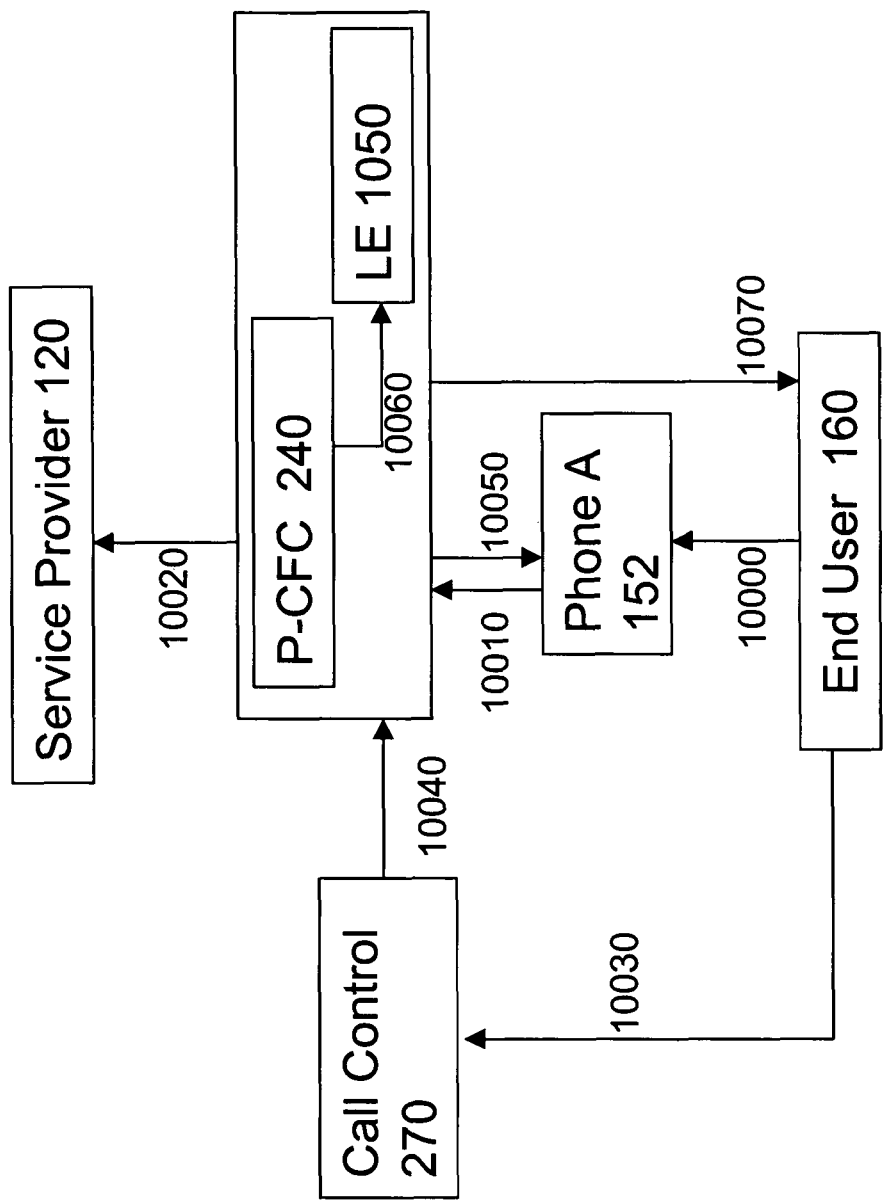

FIG. 10 is a flowchart illustrating steps for performing a simple call transfer to the Local Endpoint in accordance with an exemplary embodiment of the present invention.

Figure 11:
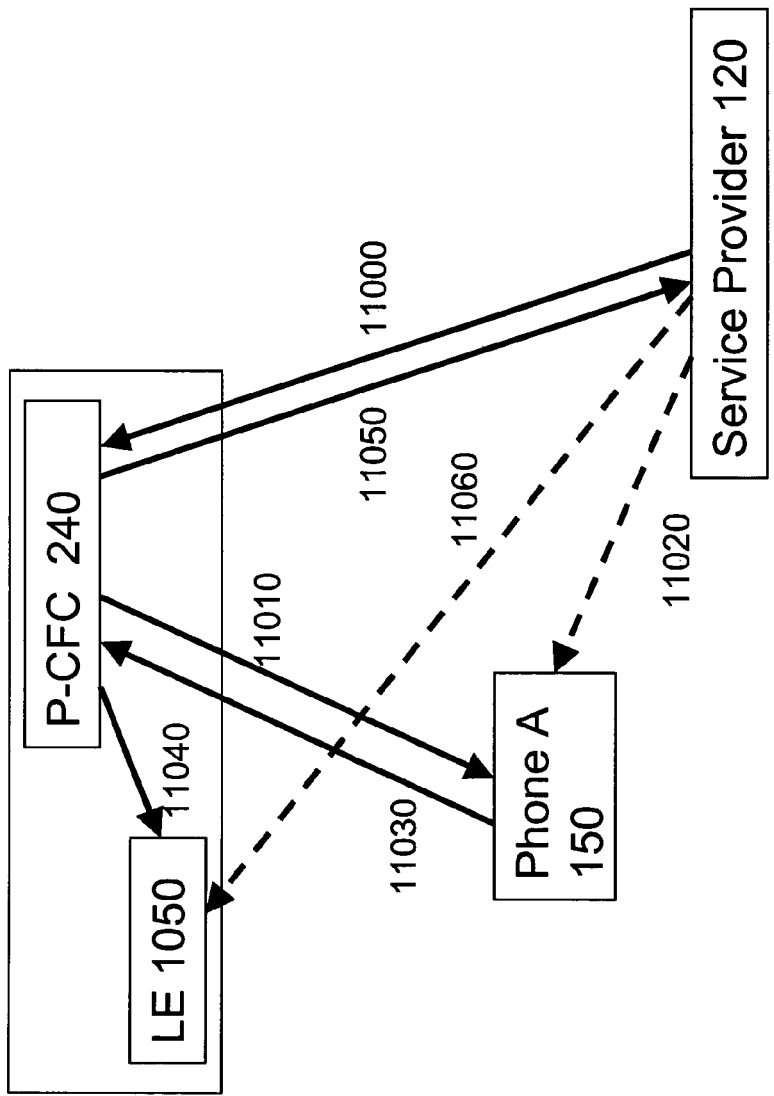

FIG. 11 Process flow showing simple call transfer among various channel paths in accordance with an exemplary embodiment of the present invention.

Figure 12:
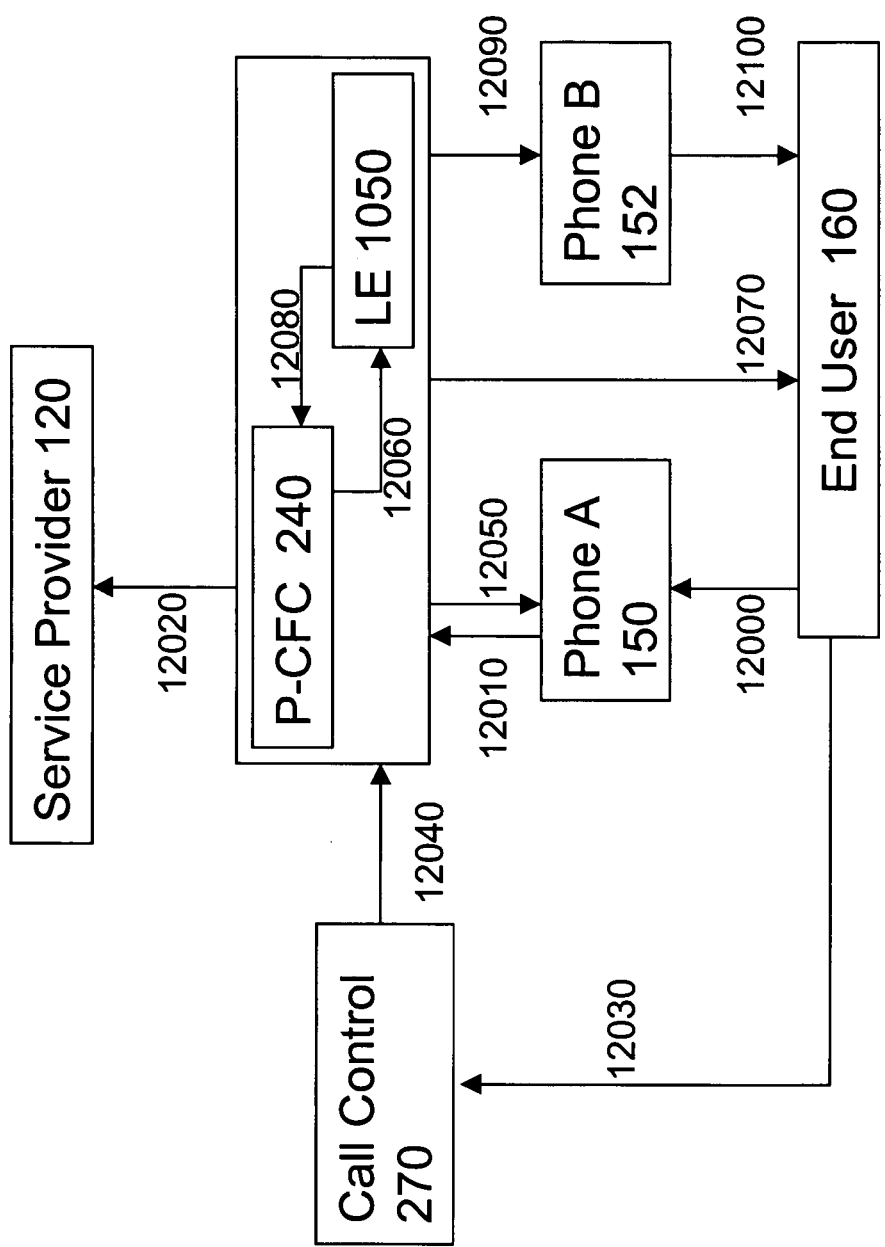

FIG. 12 Process flow showing multi-stage call transfer in accordance with an exemplary embodiment of the present invention.

Figure 13:
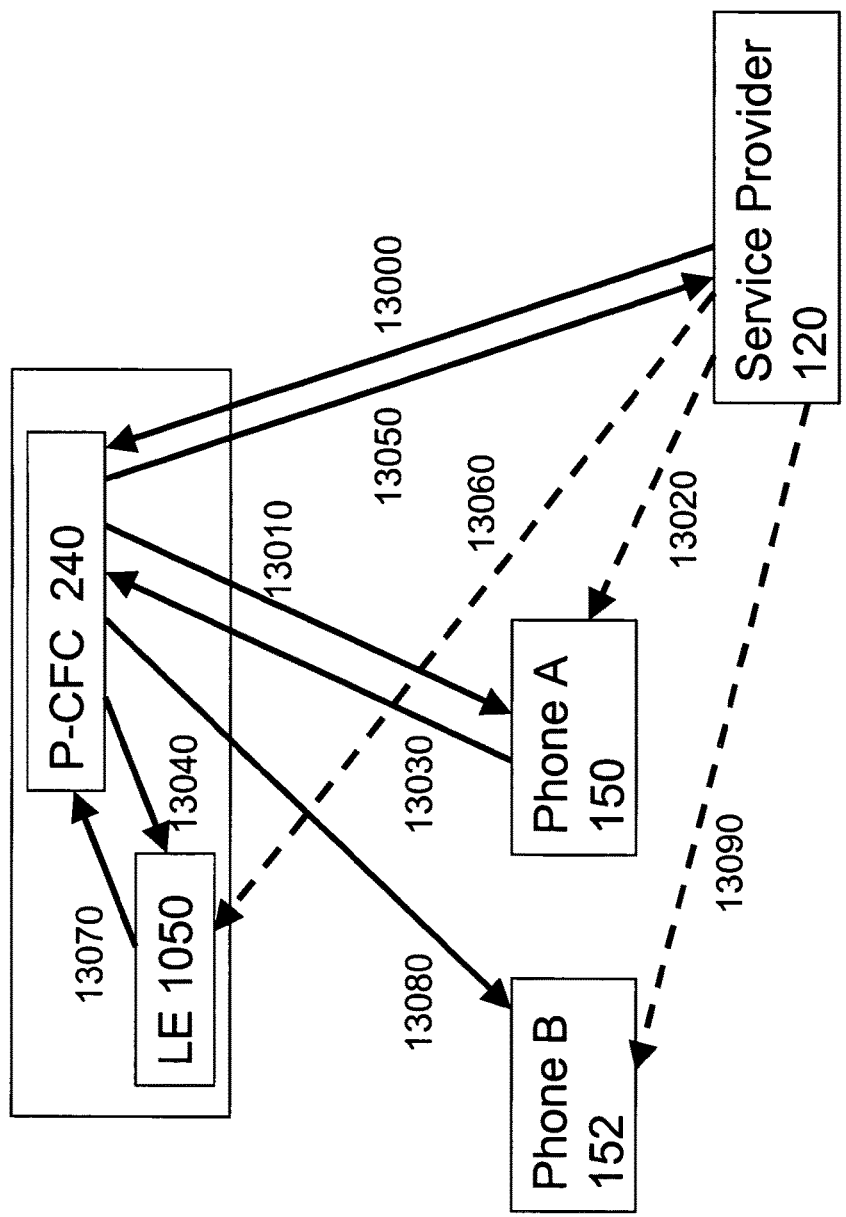

FIG. 13 Process flow showing multi-stage call transfer between various channels in accordance with an exemplary embodiment of the present invention.

DETAILED DESCRIPTION OF THE PREFERRED EMBODIMENTS

A Personal-CFC is disclosed, which has many distinguishing and novel features not found in the prior art PBX. The Personal-CFC comprises a software program that can be installed and operated on various devices such as PDAs, laptops, cell phones, PCs, end the like; this is contrasted with the prior art PBX that consists of static racks of costly hardware. The Personal-CFC can be embedded in various mobile devices like PDAs and laptops in order to move with the end user. Therefore, the Personal-CFC is clearly distinguished from the prior art PBX whose static racks cannot be moved. In addition, the Personal-CFC allows various telephone features such as dialing, audio settings and multimedia settings and the like to be upgraded or modified instantly by the End User; this is clearly distinguished from the prior art PBX where the telephone features described above cannot be upgraded or modified instantly by the End User. The Personal-CFC allows the End User to modify the various telephone features on telephones not belonging to the End User, such as a conference phone, provided the identity (such as the telephone number or telephone address) is known; this is clearly distinguished from the prior art PBX where it is not possible to modify the various telephone features on telephones not belonging to the End User. In addition, one telephone can present various feature sets, depending on which user is controlling it, and it is not necessary to disconnect the wire connecting the conference phone from the service provider. Therefore, the disclosed Personal-CFC has many distinguishing and novel features not found in the prior art PBX.

FIG. 2 illustrates the system and structural properties of Personal-CFC 240, which includes an Enhanced Feature Set 242, Basic Feature Set 243, Multimedia Feature Set 255, Text to Speech 244 to provide voice feedback where using visual feedback might not be convenient (e.g., "do you want to call John?"), Voice Recognition 245 to provide voice dialing, voice navigation capabilities, Keypad Touch Panel 246 for manipulating/selecting various features and Other Features 247. In addition, Computing Device 241 includes Display Screen 248 used to provide feedback to the End User, which also is used for GUI used by Personal-CFC, Stylus 249 used to input End User commands and choices for the Personal-CFC, Microphone and Speaker 250 used to respectively provide End User input, and feedback in audio format for the End User by Personal-CFC, and finally Other Features 251.

Personal-CFC 240 is connected downwards to various service providers, such as Service provider A (work) 220, Service Provider B (Home) 222 and Service Provider C (Home) 228.

Personal-CFC 240 is also connected upwards to various telephones, such as Phone A 150, Phone B with Audio 152, Phone C with Video 154 and Phone N 158. It can be seen that Personal-CFC 240 provides a common EFS 242 and BFS 243 interfaces interface to various telephones/endpoints. Personal-CFC 240 uses the combined maximum media capabilities of these telephones (e.g., audio-phone by default and videophone in if screen is present). All basic (e.g., DTMF dial) and enhanced (e.g., voice dial) features are provided via Personal-CFC 240. With this approach, two End Users can use the same telephone device, using their own customized interfaces (e.g., conference room phone). Personal-CFC 240 will appear as a media-rich endpoint to the various service provider equipment (PBX/Centrex at work, various services at home), but will appear as a PBX to the various telephones—Phone A 150, end the like . . . . Personal-CFC 240 can be built as any device (e.g., stand-alone, or as residing on a desktop PC, or a cell/smart phone). However, by implementing the Personal-CFC on a personal device like Personal Digital Assistant (PDA), or laptop computer, the mobility of that device will greatly enhance its benefits (the device being always with the user and within reach).

Call Control 270 is a connection loop from End User 160 to Personal-CFC 240 that allows End User 160 to dynamically control various aspects, which are embedded inside Personal-CFC, such as Enhanced feature set 142 and Voice recognition 245. This completes the device and structural aspects of Personal-CFC 240.

Process step diagrams are shown in the following figures, which show various entities and the sequential interactions between the entities.

A process step diagram for an incoming call is shown in FIG. 3. This diagram Interaction 3000 shows Service Provider 120 alerting Personal-CFC 240. Interaction 3010 shows Personal-CFC 240 querying End User 160 where new incoming call should be placed. This query could be either explicit by prompting user to take an action, or implicit by querying stored user rules in users profile. Interaction 3020 shows End User 160 selecting device of choice, and notifying Personal-CFC 240. Device of choice could be any conveniently placed telephones that are not necessarily under the End User control (e.g., conference phone, coworker's phone). Interaction 3030 shows Personal-CFC ringing/alerting selected telephone device—Phone A 150. Interaction 3040 shows Phone A 150 ringing to let the End User 160 answer incoming call. Interactions 3050, 3060, and 3070 show End User 160 answering the call, making the connection and starting the conversation. back to back user agent (B2BUA) entities, described in IETF RFC 3261 (Session Initiation Protocol), can perform some but not all the functionality shown in FIG. 3.

A process step diagram involving a single device flow for an outgoing call is shown in FIG. 4. Consider the act of an outgoing call using Phone A 150. Phone A 150 could be configured to automatically connect to the Personal-CFC 240, so, for example, voice dialing capabilities could be used, regardless if service provider has such a provision or not. Since multiple telephones (e.g., work and home), can be associated with one Personal-CFC, the same enhanced features could be provided to these telephones.

Interaction 4000 shows End User 160 selecting Phone A 150. Interaction 4010 shows End User 160 contacting (dialing or automatic call detection) Personal-CFC 240, and selecting proper telephone address (e.g., telephone number, IP address, SIP address). Interaction 4020 shows Personal-CFC 240, based on specified End User 160 rules, dialing-out using a preferred Service Provider A 220. Rules could be very simple, (e.g., during the working hours, dial out using my work provider, otherwise my home). Or Rules could be more complex (e.g., if calling home, use home provider, regardless of time of the day.).

A process step diagram involving calling out using a telephone selected via Personal-CFC is shown in FIG. 5. End User 160 first specifies which telephone is the most convenient to use using the Personal-CFC. End User 160 commands are entered using Stylus 249 FIG. 2, and Keypad Touch Panel 246 FIG. 2. This way, End User 160 has an option to select End User's coworker telephone as a preferred device, or being in the conference room, it could be that the conference room telephone. Interaction 5100 shows End User 160 using Personal-CFC 240 directly, and specifying the local telephone End User 160 wants to use (in this case, Phone A 150, and the telephone number needed to dial the person that should be contacted. Interaction 5110 shows Personal-CFC 240 ringing and alerting local Phone A 150. Interaction 5120 shows Personal-CFC 240 ringing and alerting telephone address to be contacted. Interaction 5130 shows Phone A 150 is ringing. Interaction 5140 shows End User 160 lifting the handset. Interactions 5150, 5160 show that connection between the local Phone A 150 and remote telephone through the Service Provider A 220 is being made and conversation begins.

A process step diagram involving an incoming split media call flow is shown in FIG. 6. A split media call will occur when End User is receiving a media-rich call and does not have one device that can handle all incoming media streams, such as voice, video or data. Interaction 6000 shows that service provider 120 is ringing and alerting Personal-CFC 240 about incoming media-rich call. Interaction 6010 shows Personal-CFC 240 is notifying End User 160 about the call, and querying termination points that can be used for that call. A query can be either explicit, by notifying the End User 160, or can be implicit, by doing a lookup for preassigned termination points (e.g., what is the default video output, which video camera to use). Interaction 6020 specifies device of choice to be used for various media streams. Selected telephones might be any telephones that are located in convenient locations, e.g., conference room telephone for audio, and a computer monitor or a screen of a PDA or laptop for video output, and finally an Internet web camera that might be in the same room. Selected devices do not have to be 'owned' by the End User. It is sufficient that they are accessible by End User 160. Interaction 6030 shows Personal-CFC 240 ringing the selected telephone. Interactions 6050, 6060 show End User 160 answering selected device and the call is taking place. Interactions 6080, 6090 show Personal-CFC 240 adding video capabilities (Video In and/or Out) to the call. All media streams included in the incoming call do not need to be terminated on one feature rich telephone (endpoint). Using Personal-CFC 240, a convenient collection of devices can be used to match or exceed incoming call capabilities.

The act of combining different devices for one media rich call, in order to generate or terminate different media streams, will be called a Media-Split. A process step diagram involving an outgoing call that uses Media-Split is shown in FIG. 7. Interaction 7000 shows End User 160 using Personal-CFC 240 and selecting remote telephone address and local telephones that combined together will provide for media-rich outgoing call. A specification of local telephones could be either explicit, by providing their telephone addresses, or implicit, by using stored/preferred information. Telephones used as combined media-rich endpoint (one device for voice, one for video, and optionally one for data), do not need to be in the same physical location. This provision lets the End User 160 make 'security' calls to security personnel, possibly having camera observation capability, to trace a possible security threats. Security personnel equipped with telephone having audio and video out capabilities can talk to a dispatcher to walk security personnel through and use the video output as an additional clue. Interaction 7010 shows Personal-CFC 240 ringing a chosen Phone A 152 that provides audio capabilities only. For the purpose of the discussion in FIG. 7 and to show new capabilities provided by Personal-CFC 240, we have chosen Phone A 152 to be audio only. However, this telephone can be a full featured telephone as well. Interactions 7020, 7060 show Personal-CFC 240 making an outgoing call using chosen Service Provider (selection of Service Provider is described in FIG. 4). Remote user answers the call, and the connection between remote telephone and Personal-CFC 240 is established. Interactions 7030, 7040, 7050 show selected Phone A 152 ringing. End User 160 answers the telephone, connection is made and telephone conversation starts. Interactions 7070, 7080 show Personal-CFC 240 adding Phone B 154 that complements Phone A 152 with capabilities to terminate/originate additional media streams (in this case video stream). Phone B could be a computer monitor, PDA/laptop screen, TV screen; however, but it is not limited to these. Also, media streams that could be combined into a single call are not limited to audio and video, but can include other types of media streams.

One of the major benefits of using Media-Split technology is that Personal-CFC can be implemented on a device that is equipped with a small screen (e.g., PDA). In such a case, video origination/termination capabilities can be provided by that PDA. With the ability to split the call, and use any convenient telephone even with audio only capabilities, End User upgrades, for the duration of the call, that telephone to be a fully featured audio/video endpoint. Therefore, this invention provides for a virtual feature set that can be transported from one site to another by an End User, and can applied to different telephones at the various sites, providing the same interface to various devices. This virtual feature set is unavailable with the conventional technology.

A process step diagram showing a simplified view of an outgoing call with split media is shown in FIG. 8. It is possible to control a telephone by a proxy (the word proxy is taken here to mean control by an intermediate party). In this example, Service Provider 120 uses its call control to connect to Personal-CFC 240, which transfers by proxy a call control channel to Phone A with audio capabilities 152 and also to Phone B with video capabilities 154 in order to control multiple devices used to provide media-rich combined capabilities. Then Service Provider 820 directs the audio stream to Phone A 152 as shown by the dashed arrow, and directs the video stream to Phone B 154 as shown by the dotted arrow.

A process step diagram showing an alternative simplified view of an outgoing call with split media is shown in FIG. 9. This figure illustrates a simplified view of how various channels of Media-Split call are connected, in the event that either Service Provider 120 or Phone A audio 152 or Phone B video 154 are not capable of receiving calls where control channel and media channels are coming from different directions. In this example, Personal-CFC 240 acts as a routing point for various media channels. Call control channels are shown by the solid arrows, voice media channels are shown by the dashed arrows, and video media channels are shown by the dotted arrows.

A process step diagram showing a simplified call to a local endpoint (LE) is shown in FIG. 10. A local endpoint is a telephone that resides on the same computing device with communication capabilities as the Personal-CFC. Interactions 10000, 10010, 10020 show that an original call between End User 160 and remote user represented by Service Provider 120 has been established. Interactions 10030, 10040 show that End User 160 has decided to switch from Phone A 152 to the Local Endpoint 1050. Interaction 10050 shows Personal-CFC after receiving request for the transfer, tearing down the local call leg to the Phone A 152. Interaction 10060 shows Personal-CFC activates Local Endpoint 1050. It is also possible to transfer a call from Local Endpoint 1050 to the Phone A 152, as described above.

A process step diagram illustrating a simple call transfer to the local endpoint (LE) by various channel paths is shown in FIG. 11. Interactions 11000, 11010, 11020 show that original call using Phone A 150 and remote telephone using Service Provider 120 is established. Interaction 11030 shows that the call from Personal-CFC 240 to local Phone A 150 is torn down (i.e., call control channel is removed from Phone A 150). Interaction 11040 shows that Local Endpoint 1050 has been activated (call control channel has been established). Interaction 11050 shows that a request to Service Provider 120 has been made to redirect media channel to Local Endpoint 1050, and Interaction 11060 shows that a media channel has been redirected to Local Endpoint 1050.

A process step diagram showing a multi-stage call transfer is shown in FIG. 12. A multi-stage call transfer allows End User 160 to initiate a call on one telephone and transfer it to the Local Endpoint. Subsequently, the End User 160, while still having an active call on the Local Endpoint, can walk to a different location (e.g., conference room). Finally, the End User 160 can transfer that call to a telephone in that new location. While all these activities are being accomplished, the End User is in full control of the pending call and never loses control. This gives the End User 160 tremendous control over the pending call. Interactions 12000, 12010, 12020 show that the original call between the End User 160 using Phone A 150 and remote user represented by Service Provider 120 has been established. Interactions 12030, 12040, 12050, 12060, 12070 show that a call has been transferred to the Local Endpoint (as per FIG. 10). Interaction 12080 shows that a local call leg to the Local Endpoint 1050 has been torn down. Finally, interactions 12090, 12100 show that Phone B 152 has been chosen for local termination of the pending call.

A process step diagram showing a multi-stage call transfer between various channel paths is shown in FIG. 13. Interactions 13000-13060 show steps equivalent to FIG. 11 steps 11000-11060. Interaction 13070 shows that a connection to the Local Endpoint 1050 has been torn down. Interaction 13080 shows that a connection to the Phone B 152 has been established. Interaction 13090 shows that a media path to Phone B 152 has been added.

The scenario in FIG. 13 illustrates two features of exemplary embodiments of the present invention: (a) the usage of Local Endpoint as a temporary termination of the pending call, and (b) the usage of Personal-CFC as a device that enables the End User to own the call (being able to control the telephone call during all stages of transfer), even after the End User has moved to a new site. This allows the End User to walk, while listening to a pending call on the Local Endpoint, to a different location, where the End User can transfer the call to a newly selected telephone. A traditional telephone transfer can be called a "blind transfer", where the End User forwards a call to a transfer telephone that should remain connected for the duration of the transfer. While the transfer is made, the End User can hasten to the site of the transfer telephone and pick up the telephone there, before it will be interrupted by its answering machine. The call is lost if there is a missing transfer telephone, a broken transfer telephone, or if the answering machine is activated. Using the preferred method embodied in FIG. 13, the End User has the convenience of searching out a person that could join that conversation, and even decide if the call should be placed instead on other telephones, such as that co-worker's telephone or a conference room telephone.

A computer program has been developed which implements the above Personal-CFC processes in FIGS. 2-13 and associated text. This program exhibits all the beneficial features of the Personal-CFC. This program is included as a CD-ROM in Appendix A. It is written in C++ and runs on Microsoft Pocket PC 2002 devices (PDAs).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A method comprising:
   receiving information about a telephone call at a Personal Call and Feature Control system (Personal-CFC),
   wherein the telephone call is one of an incoming call from a service provider and an outgoing call to the service provider;
   allowing an End User to choose a first device among a plurality of different devices for handling the telephone call, the first device having a first feature set that is different from a feature set of one or more other of the plurality of different devices;
   connecting, through the Personal-CFC, the telephone call between the service provider and the first device without any interaction with the service provider,
   wherein the user is able to handle the telephone call between the service provider and the first device with the first device using the first feature set, and
   wherein the connection between the service provider and the first device through the Personal-CFC is exclusively controlled by the Personal-CFC for a duration of the telephone call from beginning to end, wherein the first device does not interact with the service provider to control the connection during the duration of the telephone call.

2. A method according to claim 1, further comprising, within the duration of the telephone call and after connecting the telephone call between the service provider and the first device:
   adding, using the Personal-CFC without disconnecting the telephone call from the service provider, one or more new media streams associated with the telephone call to one of the first device and a different second device.

3. A method according to claim 2, wherein the media streams comprise one or more of voice input, voice output, video input, video output, data input and data output.

4. A method according to claim 2, wherein one or both of the first and second device is a telephone.

5. A method according to claim 2, wherein one or both of the first and the second device is one of a computer monitor, a computer camera and a computer microphone.

6. A method according to claim 2, wherein one or both of the first and the second device is one of a PDA screen, a PDA camera, a PDA microphone, and a PDA speaker.

7. A method according to claim 2, wherein one or both of the first and the second device is a video input/output device.

8. A method according to claim 2, wherein one or both of the first and the second device is a data input/output device.

9. A method comprising:
   receiving information about a telephone call at a Personal Call and Feature Control system (Personal-CFC),
   wherein the telephone call is one of an incoming call from a service provider and an outgoing call to the service provider;
   allowing an End User to choose a first device among a plurality of different devices for handling the telephone call, the first device having a first feature set that is different from a feature set of one or more other of the plurality of different devices;
   connecting, through the Personal-CFC, the telephone call between the service provider and the first device without any interaction with the service provider,
   wherein the user is able to handle the telephone call between the service provider and the first device with the first device using the first feature set, and
   wherein the connection between the service provider and the first device through the Personal-CFC is exclusively controlled by the Personal-CFC for a duration of the telephone call from beginning to end, wherein the first device does not interact with the service provider to control the connection during the duration of the telephone call;
   the method further comprising, within the duration of the telephone call and after connecting the telephone call between the service provider and the first device:
      removing, using the Personal-CFC without disconnecting the telephone call from the service provider, a media stream from two or more media streams associated with the telephone call from any device controlled by Personal-CFC, wherein the removed media stream is being handled by one of the first device and a different second device.

10. A method according to claim 9, wherein the media streams comprise two or more of voice input, voice output, video input, video output, data input and data output.

11. A method according to claim 9, wherein one or both of the first and second device is a telephone.

12. A method according to claim 9, wherein one or both of the first and the second device is one of a computer monitor, a computer camera and a computer microphone.

13. A method according to claim 9, wherein one or both of the first and the second device is one of a PDA screen, a PDA camera, a PDA microphone, and a PDA speaker.

14. A method according to claim 9, wherein one or both of the first and the second device is a video input/output device.

15. A method according to claim 9, wherein one or both of the first and the second device is a data input/output device.

16. A method comprising:
   receiving information about a telephone call at a Personal Call and Feature Control system (Personal-CFC),
   wherein the telephone call is one of an incoming call from a service provider and an outgoing call to the service provider;
   allowing an End User to choose a first device among a plurality of different devices for handling the telephone call, the first device having a first feature set that is different from a feature set of one or more other of the plurality of different devices;
   connecting, through the Personal-CFC, the telephone call between the service provider and the first device without any interaction with the service provider,
   wherein the user is able to handle the telephone call between the service provider and the first device with the first device using the first feature set, and
   wherein the connection between the service provider and the first device through the Personal-CFC is exclusively controlled by the Personal-CFC for a duration of the telephone call from beginning to end, wherein the first device does not interact with the service provider to control the connection during the duration of the telephone call;
   the method further comprising, within the duration of the telephone call and after connecting the telephone call between the service provider and the first device:

transferring using the Personal-CFC without disconnecting the telephone call from the service provider, one or more media streams associated with the telephone call to a second device.

17. A method according to claim 16, wherein the media streams comprise one or more of voice input, voice output, video input, video output, data input and data output.

18. A method according to claim 16, wherein one or both of the first and second device is a telephone.

19. A method according to claim 16, wherein one or both of the first and the second device is one of a computer monitor, a computer camera and a computer microphone.

20. A method according to claim 16, wherein one or both of the first and the second device is one of a PDA screen, a PDA camera, a PDA microphone, and a PDA speaker.

21. A method according to claim 16, wherein one or both of the first and the second device is a video input/output device.

22. A method according to claim 16, wherein one or both of the first and the second device is a data input/output device.

* * * * *